United States Patent [19]

Uchida et al.

[11] Patent Number: 4,875,542
[45] Date of Patent: Oct. 24, 1989

[54] HYDRAULIC SYSTEM FOR VARIABLE ASSIST POWER STEERING SYSTEM

[75] Inventors: Koh Uchida, Sagamihara; Takashi Kurihara, Atsugi; Makoto Miyoshi, Kawasaki, all of Japan

[73] Assignee: Nissan Motor Co., Ltd., Yokohama, Japan

[21] Appl. No.: 213,022

[22] Filed: Jun. 29, 1988

[30] Foreign Application Priority Data

Jun. 29, 1987 [JP] Japan .................. 62-161576

[51] Int. Cl.⁴ .............................. B62D 5/083
[52] U.S. Cl. .................... 180/142; 91/375 R
[58] Field of Search ............... 180/141, 142, 143; 91/375 R, 374, 51, 166, 166, 431, 463, 464

[56] References Cited

U.S. PATENT DOCUMENTS

| | | | |
|---|---|---|---|
| 4,440,254 | 4/1984 | Shibahata et al. | 180/140 |
| 4,441,572 | 4/1984 | Ito et al. | 180/140 |
| 4,465,098 | 8/1984 | Bacardit | 137/625.21 |
| 4,512,238 | 4/1985 | Bacardit | 91/370 |
| 4,561,516 | 12/1985 | Bishop et al. | 180/142 |
| 4,561,521 | 12/1985 | Duffy | 180/142 |
| 4,565,115 | 1/1986 | Bacardit | 91/375 A |
| 4,570,735 | 2/1986 | Duffy | 180/142 |
| 4,579,186 | 4/1986 | Uno et al. | 180/142 |
| 4,586,581 | 5/1986 | Shibahata et al. | 180/140 |
| 4,588,039 | 5/1986 | Uno et al. | 180/140 |
| 4,619,339 | 10/1986 | Futaba et al. | 180/143 |
| 4,632,204 | 12/1986 | Honaga et al. | 180/142 |
| 4,640,379 | 2/1987 | Shibahata et al. | 180/140 |
| 4,672,885 | 6/1987 | Kervagoret | 91/450 |
| 4,771,841 | 9/1988 | Uchida et al. | 180/142 |

FOREIGN PATENT DOCUMENTS

| | | |
|---|---|---|
| 2568843 | 2/1986 | France . |
| 47-30039 | 11/1972 | Japan . |
| 54-15232 | 2/1979 | Japan . |
| 54-159921 | 12/1979 | Japan . |
| 56-38430 | 9/1981 | Japan . |
| 56-174363 | 12/1981 | Japan . |
| 57-30663 | 2/1982 | Japan . |
| 58-156459 | 9/1983 | Japan . |
| 60-85061 | 5/1985 | Japan . |
| 61-43229 | 9/1986 | Japan . |

Primary Examiner—John A. Pekar
Attorney, Agent, or Firm—Foley & Lardner, Schwartz, Jeffery, Schwaab, Mack, Blumenthal & Evans

[57] ABSTRACT

A variable assist power steering system employing a fluid distributor circuit of the open center type is disclosed. The fluid distributor circuit includes two parallel fluid flow paths connected to both chambers of a power cylinder respectively to produce a pressure differential between the both cylinder chambers in response to steering torque. For modulating the valve characteristics, two additional variable flow restrictors are arranged in series with two main variable flow restrictors and two bypass paths are arranged to bypass the main variable flow restrictors, respectively. The bypass paths are provided with variable flow orifice valves, respectively, which valves are controlled in response to a turning direction of a steering wheel and also to some external signal, such as vehicle speed.

11 Claims, 6 Drawing Sheets

HYDRAULIC SYSTEM FOR VARIABLE ASSIST POWER STEERING SYSTEM

RELATED APPLICATIONS

The following two U.S. patent applications were filed and assigned to the same assignee of the present application.

(1) U.S. patent application Ser. No. 044,065, filed on Apr. 29, 1987, now pending.

(2) U.S. patent application Ser. No. 102,412, filed on Sept. 29, 1987, which subsequently issued as U.S. Pat. No. 4,771,841, on Sept. 20, 1988

The following five U.S. Pat. Applications were concurrently filed on Dec. 28, 1987 and assigned to the same assignee of the present application.

(3) U.S. patent application Ser. No. 138,480, claiming priority based on Japanese patent application No. 61-313519 with a filing date of Dec. 27, 1986.

(4) U.S. Pat. Application Ser. No. 138,490, claiming priority based on Japanese patent application No. 61-313521 with a filing date of Dec. 27, 1986.

(5) U.S. patent application Ser. No. 138,479, claiming priority based on Japanese patent application No. 61-313518 with a filing date of Dec. 27,1986.

(6) U.S. patent application Ser. No. 138,402, claiming priority based on Japanese patent application No. 61-313520 with a filing date of Dec. 27,1986.

(7) U.S. patent application Ser. No. 138,345, claiming priority based on Japanese patent application No. 61-313517 with a filing date of Dec. 27, 1986.

The following four U.S. patent applications were concurrently filed on Feb. 1, 1988 and assigned to the same assignee of the present application.

(8) U.S. patent application Ser. No. 151,127, claiming priority based on Japanese patent application No. 62-19787 with a filing date of Jan. 30, 1987, now U. S. Pat. No. 4,830,131.

(9) U.S. patent application Ser. No. 151,121, claiming priority based on Japanese patent application No. 62-19783 with a filing date of Jan. 30, 1987.

(10) U.S. patent application Ser. No. 151,122, claiming priority based on Japanese patent applications No. 62-19783 with a filing date of Jan. 30, 1987 and No. 62-19786 with a filing date of Jan. 30, 1987 now U.S. Pat. No. 4,846,296.

(11) U.S. patent application Ser. No. 150,949, claiming priority based on Japanese patent application No. 62-19784 with a filing date of Jan. 30,1987.

BACKGROUND OF THE PRESENT INVENTION

The present invention relates to a hydraulic system for a variable assist power steering system.

A power steering system can be characterized as operating under three driving conditions. Firstly during straight ahead driving at medium to high speed, the power requirements on the steering system are extremely low and the degree of power assistance provided by the steering gear should correspondingly minimized to permit the feedback of road "feel" from the tires to the driver. Secondary during medium and high speed passing and cornering maneouvres, a progressive increase in the level of power assistance with driver input torque is desirable. Nevertheless moderate driver input torques should still be maintained in order that the driver can feel adequately the dynamic state of the vehicle. Thirdly, and lastly, during low speed or parking maneuvers, the power requirements on the steering system may be large and fidelity of the steering system in terms of transmitting road feel is of little importance. Under these circumstances it is generally desirable to offer large degrees of power assistance, thereby minimizing the input torque required to be furnished by the driver.

The demands for optimum valve characteristics during the above three driving conditions conflict. There are known three representative systems which have attempted to avoid the conflicting demands of the first and third driving conditions, namely the need to achieve a low level assistance for high to medium speed on-center driving while having high levels of assistance for low speed and parking maneouvres.

Firstly, there is known an oil flow controlling system which exploits the fact that the degree of power assistance varies with the flow of oil passing through valve. For example, in one such widely used system, the power steering pump is caused to reduce the flow of oil as vehicle speed increases. However, this adversely affects valve performance in the second driving condition above, namely medium to high speed passing and cornering maneuvers, where progressive valve response is impaired due to the low oil flow. Also, in the event that such a steering maneuver requires rapid turning of the steering wheel, the lower pump flow may be inadequate, rendering the power assistance momentarily inoperative. If a pump is used which can discharge oil flow high enough to offer a sufficiently high power assistance during rapid turning at high vehicle speed, the overabundance of oil flow is discharged during low speed or parking maneuver. Such a pump with a large discharge capacity, however, causes an increase in the amount of heat emitted from the whole hydraulic system, thereby requiring an arrangement to dissipate heat. This results in an increase in manufacturing cost.

Secondary, a reaction controlling system is also known wherein a reaction hydraulic pressure which gives a presetting force is controlled. This system requires additional component parts for a reaction chamber and a reaction piston, and a hydraulic pressure selector valve, resulting in a bulky construction and a complicated piping. Thus, a large installation space is needed, causing an increase in manufacturing cost.

Lastly, the most satisfactory method of matching valve performance in all three of the above mentioned conditions is modulating the valve characteristic with vehicle speed. A system which provides for better modulation of power assistance with vehicle speed is disclosed in U.S. Pat. No. 4,561,521 and can be seen to employ a rotary valve with primary and secondary valve portions. A speed sensitive valve is used to control oil flow from the pump to the secondary valve portion so that at high vehicle speeds a parallel flow path is provided between the rotary valve and the pump as oil is distributed to both primary and secondary valve portions. At low vehicle speeds, the speed sensitive valve restricts the flow of oil from the pump to the secondary valve portion. During parking maneuvers, the primary valve portion acts alone in the normal manner and the secondary valve portion is vented and not fed with oil from the pump. A change from a high level of power assistance to a low level of power assistance, and conversely, is effected by a variable force solenoid which is used to establish a parallel flow path from the pump to the secondary valve portion through a variable flow orifice. A speed sensing module controls the solenoid to open and close a variable orifice valve thus providing gradual changes in the level of power assistance as the vehicle speed changes. The rotary valve used in this power steering system includes a valve housing having a circular opening which receives a valve sleeve. Positioned within the valve sleeve is an inner valve. The inner valve is formed with a primary set of longitudinal grooves forming a primary valve section, and also with a secondary set of longitudinal grooves forming a secondary valve section. The primary and secondary sets of longitudinal grooves register with primary and secondary sets of internal grooves formed in the internal wall of the valve sleeve, respectively. The primary and secondary sets of internal grooves are difficult to machine and require skilled labour because they have to be formed in the cylindrical internal wall of the valve sleeve with high precision. This results in increased production steps and manufacturing cost.

A main object of the present invention is to provide a variable assist power steering system of the less expensive and less complicated type wherein a pump with a large discharge capacity is not required and a secondary valve portion is not required either to achieve a low level power assistance for high to medium speed on-center driving while having high levels of power assistance for low speed and parking maneuvers and an adequate level of power assistance for medium to high speed passing and cornering maneuvers.

SUMMARY OF THE INVENTION

According to the present invention, there is provided a variable assist power steering system for a vehicle including a steering wheel, a pump, a reservoir, a power cylinder adapted to be connected to a steering linkage, the power cylinder defining two chambers. The power steering system, comprises:

a control valve including valve elements relatively displaceable in response to a first predetermined variable in the form of a steering torque applied by the steering wheel to define therebetween two parallel fluid flow paths connected between the pump and the reservoir to produce a pressure differential between the two chambers of the power cylinder in response to said first predetermined variable, said two parallel fluid flow paths including connections communicating with the two chambers of the power cylinder, respectively, each of said two parallel fluid flow paths being divided into an upstream section and a downstream section with respect to said connection thereof;

each of said upstream and downstream sections of said two parallel fluid flow paths including a main variable flow restrictor having an orifice area variable with said first predetermined variable.

This power steering system features that:

one of said upstream and downstream sections of each of said two parallel fluid flow paths includes an additional variable flow restrictor having an orifice area variable with said first predetermined variable and arranged in series with that one of said main variable flow restrictors which is included by said one section, said additional variable flow restrictor and said one main variable flow restrictor being disposed on the same side from one of said connections such that said additional variable flow orifice is disposed less far from said one connection than said one main variable flow restrictor is;

a pair of bypass paths, each having one end communicating with one of said two parallel fluid flow paths at said connection of said one parallel fluid flow path and an opposite end communicating with the other of said two parallel fluid flow path at a portion which is disposed more far from said connection of said the other parallel fluid flow path than said additional variable flow restrictor is but less far from said connection of said the other parallel fluid flow path than said main variable flow restrictor is;

each of said bypass paths has arranged therein at least one variable flow orifice valve which has an orifice area variable in an independent manner from the manner of varying the orifice areas of said main and additional variable flow restrictors.

BRIEF DESCRIPTION OF THE DRAWINGS

FIGS. 2(a), 2(b) and 2 (c) are diagrammatic charts showing how orifice areas of variable flow restrictors vary against steering torque;

FIG. 2(d) is a diagrammatic chart showing how orifice area of each of externally controlled variable flow orifice valves varies against vehicle speed;

DETAILED DESCRIPTION OF THE INVENTION

Figure 1:
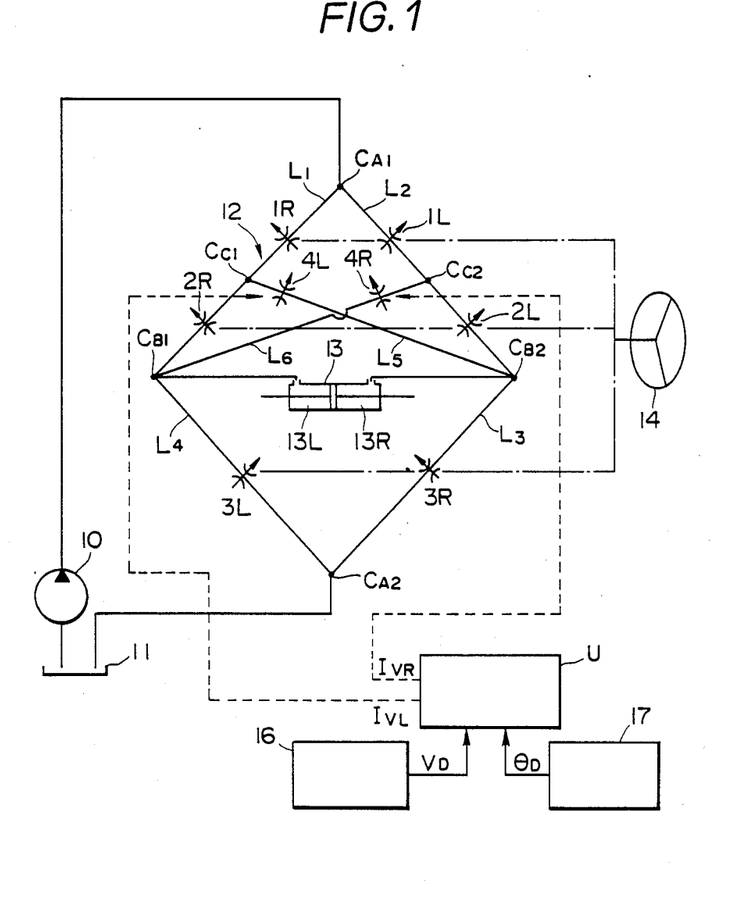
FIG. 1 is a diagram showing a first embodiment according to the present invention.

Referring to the accompanying drawings and more particularly to FIG. 1, a first embodiment of a variable assist power steering system for a vehicle according to the present invention is described. The power steering system comprises an oil pump 10 as a hydraulic fluid source, a reservoir tank 11 as a fluid source, a control valve 12 employing a fluid flow distributor circuit of the open center type, a power cylinder 13 adapted to be connected to a steering linkage of the vehicle, and a steering wheel 14. The steering wheel 14 is operatively connected to the control valve 12 suich that driver input torque (i.e., steering torque) applied to the steering wheel 14 is translated into torsion of a torsion bar, not shown, which in turn causes relative displacement of valve elements of the control valve 12. Also shown are a vehicle speed sensor 16, a steering wheel angle sensor 17, and a control unit U.

In the conventional manner, the fluid flow distributor circuit of the control valve 12 includes two parallel fluid flow paths $L_1$-$L_4$ and $L_2$-$L_3$ connected between a pump fluid supply connection $C_{A1}$ and a fluid return connection $C_{A2}$. The fluid flow path $L_1$-$L_4$ has a cylinder connection $C_{B1}$ where it communicates with a left cylinder chamber 13L of the power cylinder 13, while the other fluid flow path $L_2$-$L_3$ has a cylinder connection $C_{B2}$ where it communicates with a right cylinder chamber 13R of the power cylinder 13. The fluid flow path $L_1$-$L_4$ may be divided into an upstream section $L_1$ and a downstream section $L_4$ with respect to the cylinder connection $C_{B1}$ thereof. Similarly, the fluid flow path $L_2$-$L_3$ may be divided into an upstream section $L_2$ and a downstream section $L_3$ with respect to the cylinder connection $C_{B2}$ thereof. Arranged in the upstream sections $L_1$ and $L_2$ are two main variable flow restrictors 1R and 1L, respectively. Arranged in the downstream sections $L_4$ and $L_3$ are two main variable flow restrictors 3L and 3R, respectively. These variable flow restrictors 1R, 1L, 3L, 3R are operatively associated with the steering wheel 14 such that when the steering wheel 14 is in its central rest position, they are opened to provide unrestricted parallel flows of fluid between the fluid supply connection $C_{A1}$ and the fluid return connection $C_{A2}$. Turning the steering wheel 14 clockwise from the central rest position causes the variable flow restrictors 1R and 3R to decrease their orifice areas as steering torque increases with the other variable flow restrictors 1L and 3L kept opened to provide unrestricted fluid flows through the upstream section $L_2$ and the downstream section $L_4$, respectively. Turning the steering wheel 14 counterclockwise from the central rest position causes the variable flow restrictors 1L and 3L to decrease their orifice areas as steering torque increases with the other two variable flow restrictors 1R and 3R kept opened to provide unrestricted fluid flows through the upstream section $L_1$ and the downstream section $L_3$, respectively.

Referring to FIGS. 2(a) and 2(c), it is explained how orifice area $A_1$ of the variable flow restrictor 1L or 1R varies as steering torque T increases and how orifice area $A_3$ of the variable flow restrictor 3L or 3R varies as steering torque T increases. As shown in FIG. 2(a), the variable flow restrictor 1R has its orifice area $A_1$ decreased during clockwise turning of the steering wheel 14 such that the orifice area $A_1$ decreases rapidly as indicated by the line segment $L_{11}$ as steering torque T increases from zero till a first value $T_1$ and it decreases to substantially zero less rapidly as indicated by the line segment $L_{12}$ until steering torque T reaches a second value $T_2$ after exceeding the first value $T_1$. When steering torque T increases beyond the second value $T_2$, the orifice area $A_1$ stays substantially zero. During counterclockwise turning of the steering wheel 14, the orifice area $A_1$ of the variable flow restrictor 1L varies exactly the same manner as indicated by the line segments $L_{11}$ and $L_{12}$ shown in FIG. 2(a). As shown in FIG. 2(c), the variable flow restrictor 3R has its orifice area $A_3$ decreased during clockwise turning of the steering wheel 14 such that the orifice area $A_3$ decreases more rapidly than the orifice area $A_1$ does as indicated by the line segment $L_{31}$ as steering torque T increases from zero till a third value $T_1''$ which is smaller than the first value $T_1$ and it decreases to substantially zero less rapidly as indicated by the line segment $L_{32}$ until steering torque T reaches a fourth value $T_2''$ which is larger than the second value $T_2$. When steering torque T increases beyond the fourth value $T_2''$, the orifice area $A_3$ stays substantially zero.

Figure 4:
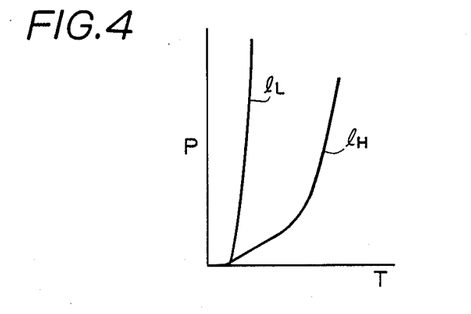
FIG. 4 is a chart showing power assist vs., steering torque characteristic curves for low and high vehicle speeds.

Assuming now that the variable flow restrictors 1R, 1L, 3R and 3L only are arranged in the fluid flow distributor circuit, turning the steering wheel 14 clockwise causes the upstream section $L_1$ and the downstream section $L_3$ to be restricted even though it leaves the upstream section $L_2$ and the downstream section $L_4$ unrestricted, resulting in a pressure increase in the right cylinder chamber 13R and a pressure drop in the left cylinder chamber 13L. The characteristic of this pressure increase versus steering torque is mainly determined by the orifice area $A_1$ versus steering torque T characteristic shown in FIG. 2(a) because the orifice area $A_3$ decreases more rapidly than the orifice area $A_1$ does. The $A_1$-T characteristic shown in FIG. 2(a) is so selected as to provide a low speed power assist vs., steering torque characteristic curve $1_L$ shown in FIG. 4.

This low speed power assist characteristic curve $1_L$ provides high levels of power assistance for low speed and parking maneouvres. However, it fails to provide a low level of power assistance required for high speed driving. A desired high speed power assist vs., steering torque characteristic is shown by curve $1_H$ is FIG. 4.

In order to achieve this high speed P-T characteristic $1_H$, two additional variable flow restrictors 2R and 2L are arranged in the upstream sections $L_1$ and $L_2$, respectively, as shown in FIG. 1. The variable flow restrictor 2R is of the same kind as the main variable flow restrictors 1R and 3R in that it has its orifice area $A_2$ decreased during clockwise turning of the steering wheel 14, while the variable flow restrictor 2L is of the same kind as the main variable flow restrictors 1L and 3L in that it has its orifice area $A_2$ decreased during counterclockwise turning of the steering wheel 14. The orifice area $A_2$ versus steering torque T characteristic is shown in FIG. 2(b). As shown in FIG. 2(b), the variable flow restrictor 2R has its orifice area $A_2$ decreased during clockwise turning of the steering wheel 14 such that the orifice area $A_2$ decreases linearly along the line segment $L_{21}$ until steering torque T reaches a fifth value $T_1'$ which is larger than the fourth value $T_2''$, then it decreases less rapidly along the line segment $L_{22}$ down to substantially zero until the steering torque T. reaches a sixth value $T_2'$. When the steering torque T increases beyond this value $T_2'$, the orifice area $A_2$ stays substantially zero. During counterclockwise turning of the steering wheel 14, the orifice area $A_2$ of the variable flow restrictor 2L varies exactly the same as shown by the line segments $L_{21}$ and $L_{22}$. The setting of the orifice area $A_2$ versus steering torque T characteristic shown in FIG. 2(b) is such as to provide the high speed power assist vs., steering torque characteristic $1_H$ shown in FIG. 4. The additional variable flow restrictor 2R is disposed less far from the cylinder connection $C_{B1}$ thereof than the main variable flow restrictor 1R is, while the other additional variable flow restrictor 2L is disposed less far from the cylinder connection $C_{B2}$ than the main variable flow restrictor 1L is. In order to bypass the main variable flow restrictor 1R during clockwise turning of the steering wheel 14, a bypass path $L_5$ is provided which has one end communicating with the fluid flow path $L_2$-$L_3$ at the cylinder connection $C_{B2}$ thereof and the opposite end communicating with the fluid flow path $L_1$-$L_4$ at a portion $C_{C1}$ which is disposed more far from the cylinder connection $C_{B1}$ than the additional variable flow restrictor 2R but less far from the cylinder connection $C_{B1}$ than the main variable flow restrictor 1R is. A variable flow orifice valve 4L is arranged in the bypass path $L_5$ to close same during counterclockwise turning of the steering wheel 14. In order to bypass the ;;main variable flow restrictor 1L during counterclockwise turning of the steering wheel 14, a bypass path $L_6$ is provided which has one end communicating with the fluid flow path $L_1$-$L_4$ at the cylinder connection $C_{B1}$ thereof and the opposite end communicating with the other fluid flow path $L_2$-$L_3$ at a portion $C_{C2}$ which is disposed more far from the cylinder connection $C_{B2}$ than the additional variable flow restrictor 2L is but less far from the cylinder connection $C_{B2}$ than the main variable flow restrictor 1L is. A variable flow orifice valve 4R is arranged in the bypass path $L_6$ to close same during clockwise turning of the steering wheel 14.

These variable flow orifice valves 4R and 4L are in the form of solenoid operated flow control valves, respectively, and have their orifice areas $A_4$ varied in response not only to a turning direction of the steering wheel 14 but also to vehicle speed. A vehicle speed sensor 16 supplies a vehicle speed indicative signal $V_D$ to the control unit U. Also supplied to the control unit U is a steering wheel angle indicative signal $\theta_D$ from a steering wheel angle sensor 17. At this control unit U, it is determined based on the steering wheel angle indicative signal $\theta$ whether the steering wheel 14 is being turned clockwise or counterclockwise. During clockwise turning of the steering wheel 14, the control unit U generates zero electric current as a solenoid current $I_{VR}$ so as to keep the variable flow orifice valve 4R fully closed irrespective of any value of the vehicle speed indicative signal $V_D$, and generates an appropriate intensity of electric current as a solenoid current $I_{VL}$ so as to control opening degree of the variable flow orifice valve 4L in proportion to the value of the vehicle speed indicative signal $V_D$. During counterclockwise turning of the steering wheel 14, the control unit U generates zero electric current as the solenoid current $I_{VL}$ so as to keep the variable flow orifice valve 4L fully closed irrespective of any value of the vehicle speed indicative signal $V_D$, and generates an appropriate intensity of electric current as the solenoid current $I_{VR}$ so as to control opening degree of the variable flow orifice valve 4R in proportion to the value of the vehicle speed indicative signal $V_D$.

The solenoid currents $I_{VR}$ and $I_{VL}$ are supplied to the variable flow orifice valves 4R and 4L so that the orifice area $A_4$ of each of the variable flow orifice valves 4R and 4L is varied in response to the intensity of the corresponding one of the solenoid currents $I_{VR}$ and $I_{VL}$. As shown in FIG. 2(d), the orifice area $A_4$ varies against vehicle speed V. More specifically, the orifice area $A_4$ gradually increases as the vehicle speed V increases.

Figure 3:
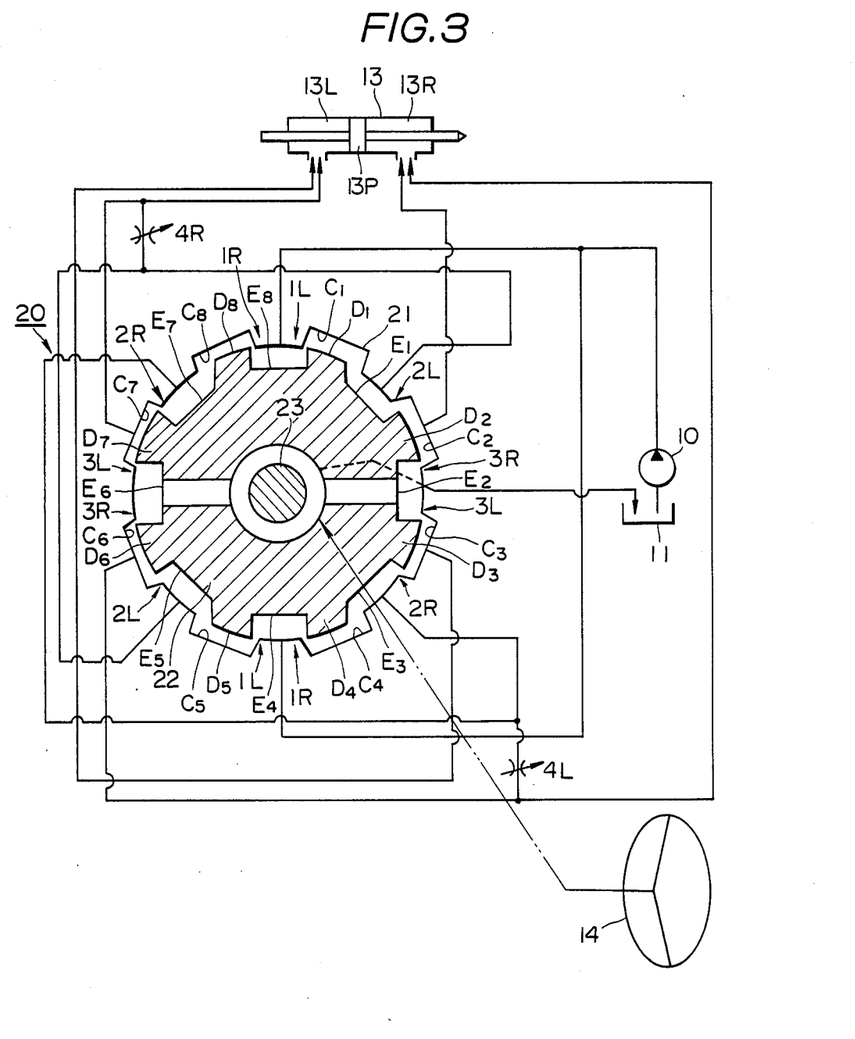
FIG. 3 is a cross section of a rotary control valve showing a valve sleeve with an inner valve disposed therein when the rotary control valve is in its central rest position.

Referring to FIG. 3, it will now be explained how the variable flow restrictors 1R, 1L, 3R, 3L and 2R, 2L are defined between two relatively displaceable valve elements of a rotary control valve 20.

As shown in FIG. 3, the rotary control valve 20 comprises a valve sleeve or body 21 connected to a pinion of a steering gear of the rack and pinion type, for example, and an inner valve 22 rotatably disposed in the valve sleeve 21 and connected to a steering wheel 14. The inner valve 22 is hollowed to receive a torsion bar 23 having one end connected to the steering wheel 14 and an opposite end connected to the pinion of the steering gear.

Formed in the cylindrical inner wall of the valve sleeve 21 are eight longitudinally extending blind ended inner grooves $C_1$, $C_2$, $C_3$, $C_4$, $C_5$, $C_6$, $C_7$, and $C_8$ which are angularly separated one after another. Formed in the outer peripheral wall of the inner valve 22 are eight longitudinally extending blind ended grooves $E_1$, $E_2$, $E_3$, $E_4$, $E_5$, $E_6$, $E_7$ and $E_8$ which are separated one after another by eight lands $D_1$, $D_2$, $D_3$, $D_4$, $D_5$, $D_6$, $D_7$ and $D_8$ which lie opposite the inner grooves $C_1$, $C_2$, $C_3$, $C_4$, $C_5$, $C_6$, $C_7$ and $C_8$, respectively. In the central rest position as illustrated in FIG. 3, the groove $E_8$ overlaps the adjacent inner grooves $C_8$ and $C_1$, the groove $E_2$ overlaps the adjacent inner grooves $C_2$ and $C_3$, the groove $E_4$ overlaps the adjacent inner grooves $C_4$ and $C_5$, and the groove $E_6$ overlaps the adjacent inner grooves $C_6$ and $C_7$.

A description is made regarding the manner how the main variable flow restrictors 1R, 1L, 3R, 3L are formed during relative displacement of the inner valve 22 with regard to the valve sleeve 21. In this case two sets of such main variable flow restrictors are formed. The variable flow restrictors 1R are formed between the mating edges of the grooves $E_8$ and $C_8$ and between the mating edges of the grooves $E_4$ and $C_4$, respectively. Two variable flow restrictors 1L are formed between the mating edges of the grooves $E_8$ and $C_1$ and between the mating edges of the grooves $E_4$ and $C_5$, respectively. Two variable flow restrictors 3R are formed between the mating edges of the grooves $E_2$ and $C_2$ and between the mating edges of the grooves $E_6$ and $C_6$, respectively. The two variable flow restrictors 3L are formed between the mating edges of the grooves $E_2$ and $C_3$ and between the mating edges of the grooves $E_6$ and $C_7$, respectively.

Two sets of additional variable flow restrictors 2R and 2L are formed. Two additional variable flow restrictors 2R are formed between the mating edges of the overlapping grooves $E_3$ and $C_3$ and between the mating edges of the overlapping grooves $E_7$ and $C_7$, respectively. Two additional variable flow restrictors 2L are formed between the mating edges of the overlapping grooves $E_1$ and $C_2$ and between the mating edges of the overlapping grooves $E_5$ and $C_6$.

The inner grooves $C_2$ and $C_6$ of the valve sleeve 21 are connected to a right chamber 13R of a power cylinder 13, while the inner grooves $C_3$ and $C_7$ o the valve sleeve 21 are connected to a left chamber 13L of the power cylinder 13. The grooves $E_8$ and $E_4$ of the inner valve 22 are connected via suitable fluid passages formed through the valve sleeve 21 to an oil pump 10. The grooves $E_2$ and $E_6$ of the inner valve 22 are connected via radial and axial passages formed in the inner valve 22 to a reservoir tank 11. The grooves $E_1$ and $E_5$ are connected via fluid passages through the valve sleeve 21 and a vriable flow orifice valve 4R to the left chamber 13L of the power cylinder 13. The grooves $E_3$ and $E_7$ are connected via fluid passages formed through the valve sleeve 21 and a variable flow orifice valve 4L to the right chamber 13R of the power cylinder 13.

Let us assume that the steering wheel 14 is in its central rest position when the vehicle is at a standstill. Under this condition, the main variable flow restrictors 1R, 1L, 3R, 3L and the additional variable flow restrictor 2R, 2L are fully opened, while the variable flow orifice valves 4R, 4L are fully closed since the vehicle speed detected by the vehicle speed sensor 16 is zero. The bypass paths $L_5$ and $L_6$ are fully closed even though the parallel fluid flow paths $L_1$-$L_4$ and $L_2$ and $L_3$ are fully opened. Thus, fluid under pressure from the pump 10 is divided evenly through the variable flow restrictors 1R, 2R and 3L in one direction and through the variable flow restrictors 1L, 2L and 3R in the opposite direction. This does not cause any pressure differential between the right and left chambers 13R and 13L of the power cylinder 13. As a result, no power assistance takes place.

In turning the steering wheel 14 clockwise at zero vehicle speed, the relatively displaceable valve elements of the control valve displace in such a direction as to decrease orifice areas $A_1$, $A_2$ and $A_3$ of the variable flow restrictors 1R, 2R and 3R as steering torque T increases and to leave the other variable flow restrictors 1L, 2L and 3L fully opened. The variable flow restrictors 1R, 2R and 3R effect a throttling of each of the parallel fluid paths inducing pressure drops which in turn result in a pressure increase in the right chamber 13R of the power cylinder 13. In this case, as will be understood from comparison of FIG. 2(a) with Fig. 2(b), with the same steering torque T, the variable flow restrictor 2R provides a larger orifice area than the variable flow restrictor 1R does. Thus, the valve characteristic under this condition is determined by the variable flow restrictors 1R and 3R only. This results in providing high levels of power assistance as shown by the P-T curve $1_L$ in FIG. 4.

In turning the steering wheel 14 counterclockwise, the orifice areas of the variable flow restrictors 1L, 2L and 3L are decreased as the steering torque T increases with the other variable flow restrictors 1R, 2R and 3R left fully opened. Thus, high levels of power assistance are provided in turning the steering wheel 14 counterclockwise.

During straight ahead driving at high vehicle speed with the steering wheel 14 held at its central rest position, the steering wheel angle indicative signal $\theta_D$ of the steering wheel angle sensor 17 indicates the central rest position of the steering wheel 14, while the vehicle speed signal indicative signal $V_D$ of the vehicle speed sensor 16 indicates a high vehicle speed. Thus, relatively high solenoid currents $I_{VL}$ and $I_{VR}$ are outputted by the control unit U so that the solenoid actuators are actuated to maintain the orifice areas $A_4$ of the variable flow orifice valves 4R and 4L at a relatively large value. Since, under this condition, the steering wheel 14 is not being steered, there is no steering torque and all of the variable flow restrictors 1R, 1L, 3R, 3L, 2R, 2L are fully opened so that no pressure differential takes place between the both chambers 13R and 13L of the power cylinder 13 and no power assistance takes place.

In turning the steering wheel 14 clockwise, under this condition, the variable flow restrictors 1L, 2L and 3L are fully opened, the other variable flow restrictors 1R, 2R and 3R have their orifice areas decreased as steering torque T increases, the variable flow orifice valve 4L is fully opened and the variable flow orifice valve 4R is fully closed. Since the variable flow restrictor 1R is bypassed by the fully opened upstream section $L_2$ and the fully opened bypass path $L_5$, the orifice area vs., steering torque characteristic of the variable flow restrictor 2R cooperates with that of the variable flow restrictor 3R and thus determines the valve performance at high vehicle speed. This valve performance provides an adequate low level of power assistance as indicated by the high speed power assist vs., steering torque characteristic curve $1_H$ shown in FIG. 4.

At low and medium vehicle speeds, the orifice areas $A_4$ of the variable flow orifice valves 4R and 4L gradually vary as shown in FIG. 2(d) in response to the vehicle speed indicative signal $V_D$ during straight ahead driving. This means that the degree of fluid flows bypassing the variable flow restrictors 1R and 1L gradually increase as the vehicle speed increases. Thus, under this condition, turning the steering wheel 14, one of the variable flow orifice valves 4R and 4L is fully closed, resulting in providing a medium level of power assistance indicated by a power assist vs., steering torque characteristic curve which may be drawn in Fig. 4 between the curves $1_L$ and $1_H$.

Figure 5:
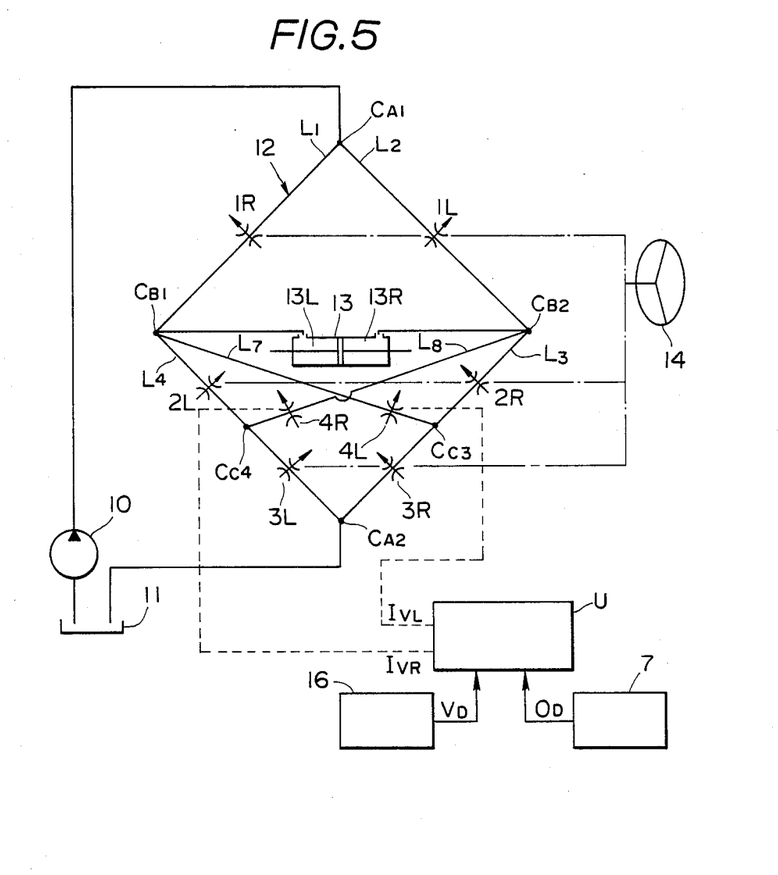
FIG. 5 is a diagram showing a second embodiment according to the present invention.

Referring to FIG. 5, an alternative embodiment is described. This embodiment is substantially the same as the previously described embodiment shown in FIG. 1 except the arrangement of additional variable flow restrictors 2R, 2L and bypass paths $L_7$, $L_8$ provided with variable flow orifice valves 4L, 4R. According to this embodiment, as readily seen from FIG. 5, the additional variable flow restrictor 2R is arranged in a downstream section $L_3$ upstream of a main variable flow restrictor 3R, while the other additional variable flow restrictor 2L is arranged in a downstream section $L_4$ upstream of a main variable flow restrictor 3L. In order to bypass the main variable flow restrictor 3R, the bypass path $L_7$ has one end connected to a cylinder connection $C_{B1}$ and an opposite end connected to the downstream section $L_3$ at a portion $C_{C3}$ disposed more far from a cylinder connection $C_{B2}$ than the additional orifice 2R is but less far therefrom than the main variable flow restrictor 3R is. The variable flow orifice valve 4L which is fully closed during counterclockwise turning of a steering wheel 14 is provided in this bypass path $L_7$. In order to bypass the main variable flow restrictor 3L, the bypass path $L_8$ has one end connected to the cylinder connection $C_{B2}$ and an opposite end connected to the downstream section $L_4$ at a location $C_{C4}$ disposed more far from the cylinder connection $C_{B1}$ than the additional variable flow restrictor 2L is but less far therefrom than the main variable flow restrictor 3L is.

In the previously described embodiments, there has been employed two solenoid operated flow control valves as the variable flow orifice valves 4R and 4L. However, the construction of the variable flow orifice valves 4R and 4L are not limited to this example. For example, each of the variable flow orifice valves may be constructed by a series arrangement of a variable flow restrictor which has its orifice area variable in response to vehicle speed and an on/off type valve which is opened or closed in response to a direction in which the steering wheel 14 is being turned.

In the previously embodiments, the variable flow orifice valves 4R and 4L have been controlled in response to vehicle speed and the steering wheel turning direction. The manner of controlling the variable flow orifice valves 4R and 4L is not limited to this example. A few of the other examples are described referring to FIGS. 6 and 7.

Figure 6:
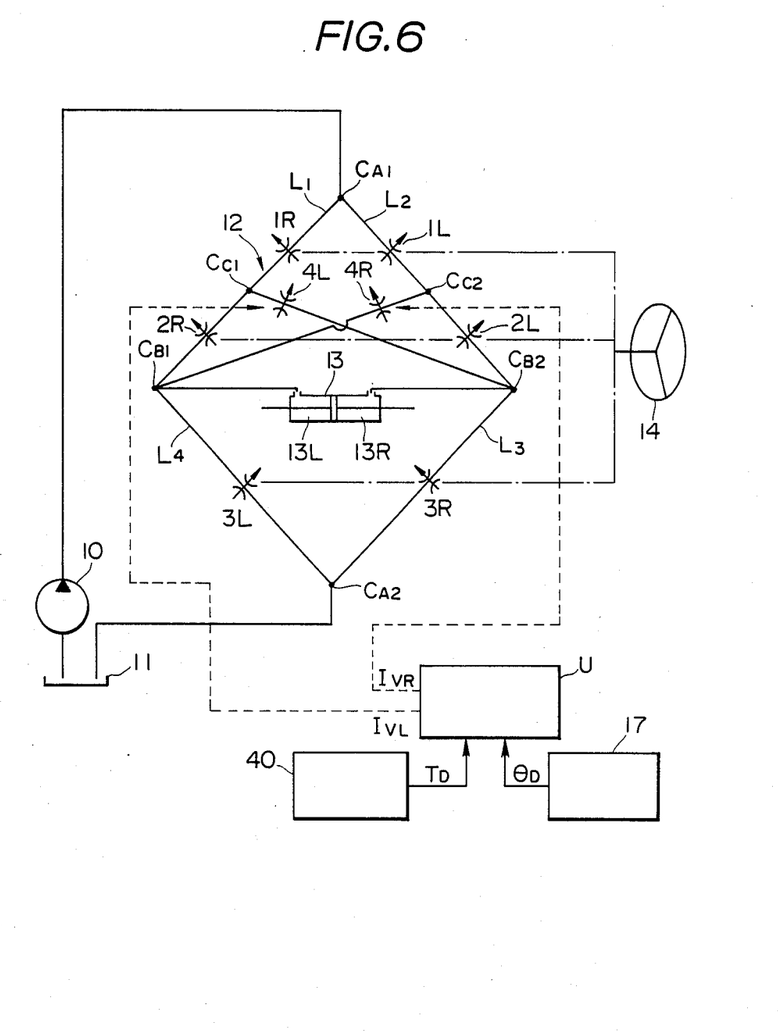
FIG. 6 is a diagram showing a third embodiment according to the present invention.

The embodiment shown in FIG. 6 is substantially the same as the previously described embodiment shown in FIG. 1 except the provision of a steering torque selector 40 in the place of the vehicle speed sensor 16. The steering torque selector 40 is composed mainly of a rotary switch manually operable by a driver and a variable resistor, and it generates an output signal $T_D$ which indicates a level of steering torque selected or preferred by the driver. This signal $T_D$ and a steering wheel angle indicative signal $\theta$ are supplied to a control unit U where the intensity of solenoid currents $I_{VR}$ and $I_{VL}$ supplied to variable flow orifice valves 4R and 4L are varied in response to the output signal $T_D$ so that the power assistance is alterted according to the preference of each driver.

Figure 7:
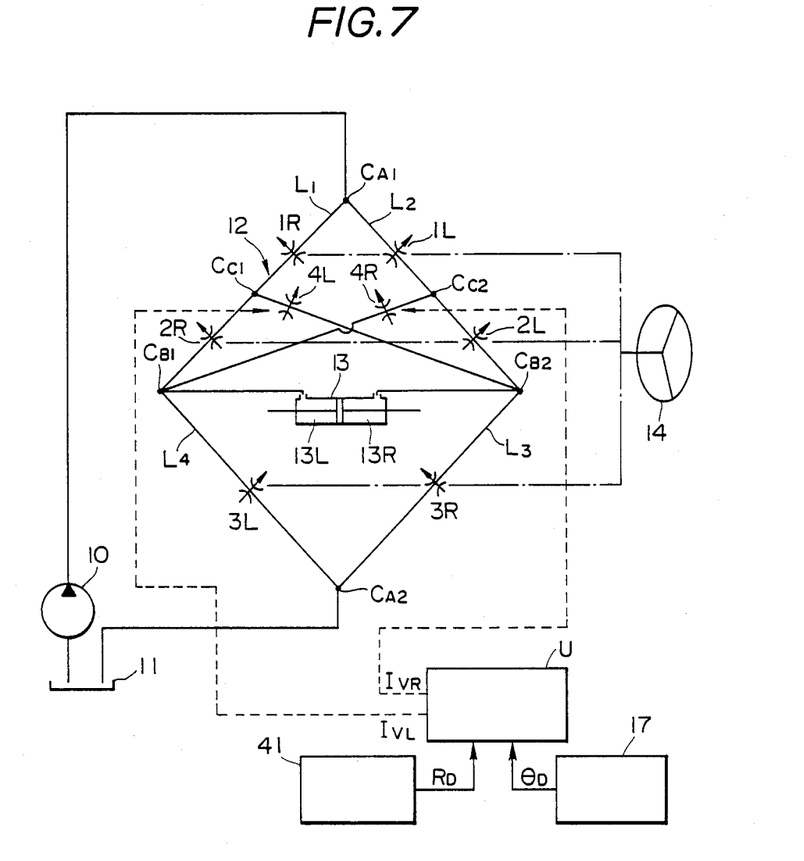
FIG. 7 is a diagram showing a fourth embodiment according to the present invention.

FIG. 7 shows another embodiment which is substantially the same as the previously described embodiment shown in FIG. 1 except the provision of a friction coefficient sensor 41 in the place of the vehicle speed sensor 16. This embodiment is designed to alter the intensity of solenoid currents $I_{VL}$ and $I_{VR}$ in response to friction coefficient of road detected by the friction coefficient sensor 16. Specifically, the road friction coefficient indicative signal $R_D$ outputted by the sensor 41 is supplied to the control unit U where the solenoid currents $I_{VR}$ and $I_{VL}$ are set to a relatively high intensity level for a low friction coefficient, to a relatively low intensity level for a high friction coefficient, and to a medium intensity level for a medium friction coefficient. Examples of the friction coefficient sensor 41 are a selector switch cooperating with a wiper switch, and a device indirectly detect a road friction coefficient, such as a rain drop sensor. It is also possible to determine road friction coefficient by computing a difference between revolution speeds of front and rear wheels which are detected by wheel speed sensiors. It is also possible to indirectly determine the road friction coefficient by detecting the amunt of splash from the traction wheels. According to this embodiment, the intensity level of the solenoid currents $I_{VR}$ and $I_{VL}$ is determined as a function of road friction coefficient and steering wheel angle. It is also possible to determine the intensity level of the solenoid currents $I_{VR}$ and $I_{VL}$ preliminary based primarily on vehicle speed and correct the result with the road friction coefficient.

Figure 2:
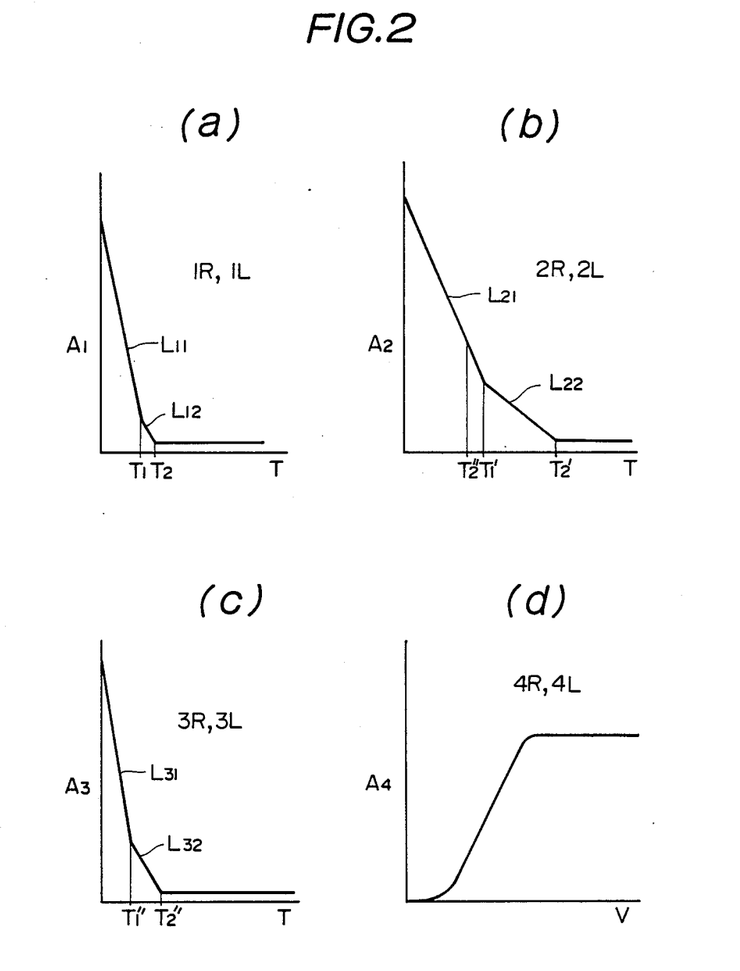

It is possible to alter orifice area vs., vehicle speed characteristic curve shown in FIG. 2 (d) in accordance with varying vehicle driving condition determined based on the result of computation of the frequence of acceleration and deceleration of the vehicle which are detected by a sensor which detects an acceleration event and a deceleration event. It is also possible to alter the above-mentioned characteristic curve in accordance not only with steering wheel angle but also with steering wheel turning speed. It is also possible to control the variable flow orifice valves 4R, 4L in response to a variation in load carried by the vehicle front wheels which is detected by a front wheel load sensor.

In the previously described embodiments, a rack and pinion type steering gear has been described as an example of a steering gear. Another types of steering gears may be used.

Although, in the previously described embodiments, the rotary control valve has been explained, a steering torque responsive spool control valve may be used to embody the fluid distributor circuit shown in the previously described embodiments.

What is claimed is:

1. A variable assist power steering system for a vehicle including a steering wheel, a pump, a reservoir, a power cylinder adapted to be connected to a steering linkage, the power cylinder defining two chambers, comprising:

a control valve including valve elements relatively displaceable in response to a first predetermined variable in the form of a steering torque applied by the steering wheel to define therebetween two parallel fluid flow paths connected between the pump and the reservoir to produce a pressure differential between the two chambers of the power cylinder in response to said first predetermined variable, said two parallel fluid flow paths including connections communicating with the two chambers of the power cylinder, respectively, each of said two parallel fluid flow paths being divided into an upstream section and a downstream section with respect to said connection thereof;

each of said upstream and downstream sections of said two parallel fluid flow paths including a main variable flow restrictor having an orifice area variable with said first predetermined variable;

wherein one of said upstream and downstream sections of each of said two parallel fluid flow paths includes an additional variable flow restrictor having an orifice area variable with said first predetermined variable and arranged in series with that one of said main variable flow restrictors which is included by said one section, said additional variable flow restrictor and said one main variable flow restrictor being disposed on the same side from one of said connections such that said additional variable flow orifice is disposed less far from said one connection than said one main variable flow restrictor is;

a pair of bypass paths, each having one end communicating with one of said two parallel fluid flow paths at said connection of said one parallel fluid flow path and an opposite end communicating with the other of said two parallel fluid flow path at a portion which is disposed more far from said connection of said the other parallel fluid flow path than said additional variable flow restrictor is but less far from said connection of said the other parallel fluid flow path than said main variable flow restrictor is;

each of said bypass paths has arranged therein at least one variable flow orifice valve which has an orifice area variable in a different manner from the manner of variation the orifice areas of said main and additional variable flow restrictors.

2. A variable assist power steering system as claimed in claim 1, wherein said additional variable flow restrictors are included in said upstream sections of said two parallel fluid flow paths.

3. A variable assist power steering system as claimed in claim 1, wherein said additional variable flow restrictors are included in said downstream sections of said two parallel fluid flow paths.

4. A variable assist power steering system as claimed in claim 1, wherein said variable flow orifice valves are controlled by a control unit in response to a direction of turning of the steering wheel which is determined based on a steering wheel angle indicative signal generated by a steering wheel angle sensor and an external signal generated by a second sensor.

5. A variable assist power steering system as claimed in claim 4, wherein said second sensor is a vehicle speed sensor.

6. A variable assist power steering system as claimed in claim 4, wherein said second sensor is a steering torque seleetor.

7. A variable assist power steering system as claimed in claim 4, wherein said second sensor is a road friction coefficient sensor.

8. A variable assist power steering system for a vehicle including a steering wheel, a pump, a reservoir, a power cylinder adapted to be connected to a steering linkage, the power cylinder defining two chambers, comprising:

a control valve including valve elements relatively displaceable in response to a first predetermined variable in the form of a steering torque applied by the steering wheel to define therebetween two parallel fluid flow paths connected between the pump and the reservoir to produce a pressure differential between the two chambers of the power cylinder in response to said first predetermined variable, said two parallel fluid flow paths including connections communicating with the two chambers of the power cylinder, respectively, each of said two parallel fluid flow paths being divided into an upstream section and a downstream section with respect to said connection thereof;

each of said upstream and downstream sections of said two parallel fluid flow paths including a main variable flow restrictor having an orifice area variable with said first predetermined variable;

wherein one of said upstream and downstream sections of each of said two parallel fluid flow paths includes an additional variable flow restrictor having an orifice area variable with said first predetermined variable and arranged in series with that one of said main variable flow restrictors which is included by said one section, said additional variable flow restrictor and said one main variable flow restrictor being disposed on the same side from one of said connections such that said additional variable flow orifice is disposed less far from said one connection than said one main variable flow restrictor is;

a pair of bypass paths, each having one end communicating with one of said two parallel fluid flow paths at said connection of said one parallel fluid flow path and an opposite end communicating with the other of said two parallel fluid flow path at a portion which is disposed more far from said connection of said the other parallel fluid flow path than said additional variable flow restrictor is but less far from said connection of said the other parallel fluid flow path than said main variable flow restrictor is;

each of said bypass paths has arranged therein a variable flow orifice valve which has an orifice area variable in a different manner from the manner of variation of the orifice areas of said main and additional variable flow restrictors; and means for controlling said variable flow orifice valve of one of said bypass paths to close said orifice area thereof when said orifice area of the other of said bypass paths is opened.

9. A variable assist power steering system as claimed in claim 8, wherein said controlling means includes sensor means for sensing a steering wheel turning direction which the steering wheel has been turned in and generating a steering wheel turning direction indicative signal indicative of the steering wheel turning direction sensed, sensor means for sensing a vehicle speed which the vehicle travels at and generating a vehicle speed indicative signal indicative of the vehicle speed sensed, and means responsive to said steering wheel turning direction indicative signal and said vehicle speed indicative signal for controlling said variable flow orifice valve of one of said bypass paths to fully close said orifice area thereof and controlling said variable flow orifice valve of the other of said bypass paths to vary said orifice are thereof in response to said vehicle speed indicative signal when said steering wheel turning direction indicative signal indicates one of the two opposite turning directions.

10. A variable assist power steering system as claimed in claim 8, wherein said controlling means includes sensor means for sensing a steering wheel turning direction which the steering wheel has been turned in and generating a steering wheel turning direction indicative signal indicative of the steering wheel turning direction sensed, sensor means for sensing a steering torque which the steering wheel has been turned with and generating a steering wheel torque indicative signal indicative of the steering torque sensed, and means responsive to said steering wheel turning direction indicative signal and said steering torque indicative signal for controlling said variable flow orifice valve of one of said bypass paths to fully close said orifice area thereof and controlling said variable flow orifice valve of the other of said bypass paths to vary said orifice area thereof in response to said steering torque indicative signal when said steering wheel turning direction indicative signal indicates one of the two opposite turning directions.

11. A variable assist power steering system as claimed in claim 8, wherein said controlling means includes sensor means for sensing a steering wheel turning direction which the steering wheel has been turned in and generating a steering wheel turning direction indicative signal indicative of the steering wheel turning direction sensed, sensor means for sensing a friction coefficient of a road which the vehicle travels on and generating a friction coefficient indicative signal, and means responsive to said steering wheel turning direction indicative signal and said friction coefficient indicative signal for controlling said variable flow orifice valve of one of said bypass paths to fully close said orifice area thereof and controlling said variable flow orifice valve of the other of said bypass paths to vary said orifice area thereof in response to said friction coefficient indicative signal when said steering wheel turning direction indicative signal indicates one of the two opposite turning directions.

* * * * *